United States Patent
Haugen et al.

(10) Patent No.: US 6,574,006 B1
(45) Date of Patent: Jun. 3, 2003

(54) METHOD FOR IMPROVING TRANSMISSION BETWEEN TERMINALS IN A TELECOMMUNICATION SYSTEM

(75) Inventors: Øystein Haugen, Kolbotn (NO); Bente Bjørngård Gundersen, Oslo (NO); Frank Lund Iversen, Hvalstad (NO); Eldor Rødseth, Asker (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/296,248

(22) Filed: Apr. 22, 1999

(30) Foreign Application Priority Data

Apr. 23, 1998 (NO) .......................................... 19981830

(51) Int. Cl.[7] .............................. B41B 1/00; H04N 1/32; H04N 1/00
(52) U.S. Cl. ..................... 358/1.15; 358/442; 358/434
(58) Field of Search ............................ 358/1.15, 442, 358/444, 468, 411, 412, 400, 434, 435–439

(56) References Cited

U.S. PATENT DOCUMENTS

| | | | | |
|---|---|---|---|---|
| 4,771,335 A | * | 9/1988 | Obara | 358/258 |
| 5,490,199 A | * | 2/1996 | Fuller et al. | 379/1 |
| 5,790,641 A | * | 8/1998 | Chan et al. | 379/100.17 |
| 6,038,037 A | * | 3/2000 | Leung et al. | 358/434 |
| 6,115,142 A | * | 9/2000 | Leung | 358/434 |
| 6,160,639 A | * | 12/2000 | Lutgen et al. | 358/442 |
| 6,335,803 B1 | * | 1/2002 | Chimura et al. | 358/434 |

FOREIGN PATENT DOCUMENTS

| | | |
|---|---|---|
| WO | WO92/02100 | 2/1992 |
| WO | WO95/19681 | 7/1995 |
| WO | WO95/22224 | 8/1995 |
| WO | WO97/44949 | 11/1997 |

* cited by examiner

Primary Examiner—Madeleine Nguyen

(57) ABSTRACT

The present invention relates to a method for improving transmission between terminals in a telecommunication system, especially the transmission between two fax machines connected for fax transmission, and in order to solve the problem of long delays and enhance the utilization of the protocols in question, it is according to the present invention suggested that the total connection between the two fax machines are divided in at least two separate connections.

3 Claims, 4 Drawing Sheets

MSC PhaseB_IllegalTCF

MSC PhaseB_Illegal_Check_Sum

METHOD FOR IMPROVING TRANSMISSION BETWEEN TERMINALS IN A TELECOMMUNICATION SYSTEM

This application claims priority under 35 U.S.C. §§119 and/or 365 to 19981830 filed in Norway on Apr. 23, 1998; the entire content of which is hereby incorporated by reference.

FIELD OF THE INVENTION

The present invention relates to a method for improving transmission between terminals in a telecommunication system.

More specifically, the present invention relates to a method for improving transmission between fax machines.

The present invention may also be said to relate to an improved utilisation of the protocols used for such fax transmission.

BACKGROUND OF THE INVENTION

The present invention has been developed in connection with overcoming the problem of long delays in modern telecommunication systems in a fax transmission.

Modern telecom systems may have long delays because a series of satellite jumps plus mobile infrastructure are applied. The protocols obeyed by fax machines were made in times where such long delays during the set-up and transmission periods would be a sign of unreliable connection. The protocol timer values are fixed, which severely reduces the possibility to tune the communication.

Known Solutions

There are essentially three basic strategies:

Request Repetitions

One general strategy is to forward commands from one fax to the other while returning a request back for the repetition of the command already received. This repetition request will make the first fax set its timer again, and the hazards that its critical timer will expire, are eliminated.

This kind of solution come in two variants, one using only T.30 commands and one applying lower level HDLC frames.

WO 92/02100 (Motorola)

To prevent two different facsimile timers from expiring during communication between two such machines connected to the GSM environment, a reset timer command (e.g. a command repeat signal) is automatically sent by the interface.

WO 95/22224

To prevent facsimiles to timeout due to long satellite delay, after a period t1, a holding signal is sent. After a further period t2 a command repeat signal is sent, so that the transmitted signal is repeated if the called terminal has not transmitted a response.

Response Anticipation

The second strategy is to anticipate the acknowledgement from the second fax and send confirmation to the first fax in order to keep it happy and within its time limits. In most of these situations the anticipation will be correct, but in those cases where problems are detected, recovery action must take place.

Fax Mail Box

The third strategy is to buffer the whole fax in a fax mail box and retransmit it at a later point in time.

Problems with Known Solutions

The known solutions are more time-consuming and probably less robust for variances in the fax vendor implementations.

Request Repetitions

The problem with this kind of solution is that it cannot be applied in all situations as T.30 has no general request for repetition.

Response Anticipation

The problem with this is mainly that it relies upon fax vendors to comply with the same interpretation of T.30 in situations which T.30 originally did not foresee. This holds for the recovery actions when the anticipation does not hold.

Fax Mail Box

The main problem with this solution is that it exaggerates the delay. This means that the use of buffer space is more than needed, and that relatively synchronous desires, such as the request for combined speech and fax, cannot be properly handled.

OBJECTS OF THE INVENTION

An object of the present invention is to provide a method which solves the problem of long delays in modern telecommunication systems in a fax transmission.

Another object of the present invention is to provide a method which is more robust towards variances in fax implementations.

Still another object of the present invention is to provide a method giving extra flexibility where the standard constant delays in fax transmission may become too short.

Still another object of the present invention is to provide a method in which the delay problems of any protocol used in such point-to-point transmission, may be overcome.

DISCLOSURE OF THE INVENTION

The above objects are achieved in a method as stated in the preamble, which according to the present invention is based on the assumption that the total-connection between two fax machines are divided in at least two separate connections.

More specifically this method could be implemented by introducing a device which may be termed an "interceptor", for example an interceptor made by Ericsson which includes the implementation of a fax adapter.

Each of the two separate connections is assumed not to be subject to any delay problems.

Further features and advantages of the present invention will appear from the following description taken in conjunction with the enclosed drawings, as well as from the appending patent claims.

BRIEF DISCLOSURE OF THE DRAWINGS

DETAILED DESCRIPTION OF EMBODIMENTS

The solution according to the present invention is based on the assumption that the total connection between the two fax machines are divided in at least two separate connections by a device which we here call an "interceptor" made by Ericsson, which includes the implementation of a Fax Adaptor. Each of the two separate connections are assumed not be subject to the delay problems.

The idea is basically to have the Interceptor fool the faxes on both ends.

The correctness of the solution is based solely on the ITU T.30 standard, meaning that as long as the faxes adhere to the mandatory parts of T.30, they should be susceptible to our solution.

The solution is described in greater detail and more precisely in an MSC document. MSC (Message Sequence Charts) is a formal language standardised by ITU in Z.120.

The strategy means that the Interceptor is both a fax receiver and a fax transmitter tied together tightly by internal communication. Thus the delay problem is overcome by buffering the fax transmission in the Interceptor.

A maximum of one fax page is buffered. In general the buffering amounts to the difference between the full delay and the fixed fax timer T2 (3 seconds). The full delay will also depend on the maximum speeds of the two connections.

During the initial negotiation phase it is again necessary to keep the waiting party busy and we propose to send a special interceptor fax front page which also could explain about the added delays. After the transmission of the interceptor front page, the necessary parameters are known to the interceptor and the relative speeds of the two connections can be tuned in order to have the two connections reasonably synchronised.

Alternating speech and fax and other special commands are available subject to the same extra delay.

Normal Situation Phase B

The normal situation is characterized by the fact that there are no communication problems with any of the two legs connected to the interceptor. However, the combined delay of the two legs slightly exceeds the fixed delay timer T4 (app. 3 seconds) of T.30 at one of the end faxes. We assume that the T2 (app. 6 seconds) of T.30 will not be exceeded.

We give three slightly different solutions to Phase B of the fax transmissions. The first and most promising solution is to send an illegal training sequence from the interceptor to the called fax in order to have it come back with an FTT and expecting another DCS.

The second solution is to produce a check sum error and the third solution is to send a special front page always.

First solution: Illegal TCF
Reference is made to FIG. 1

Figure 1:
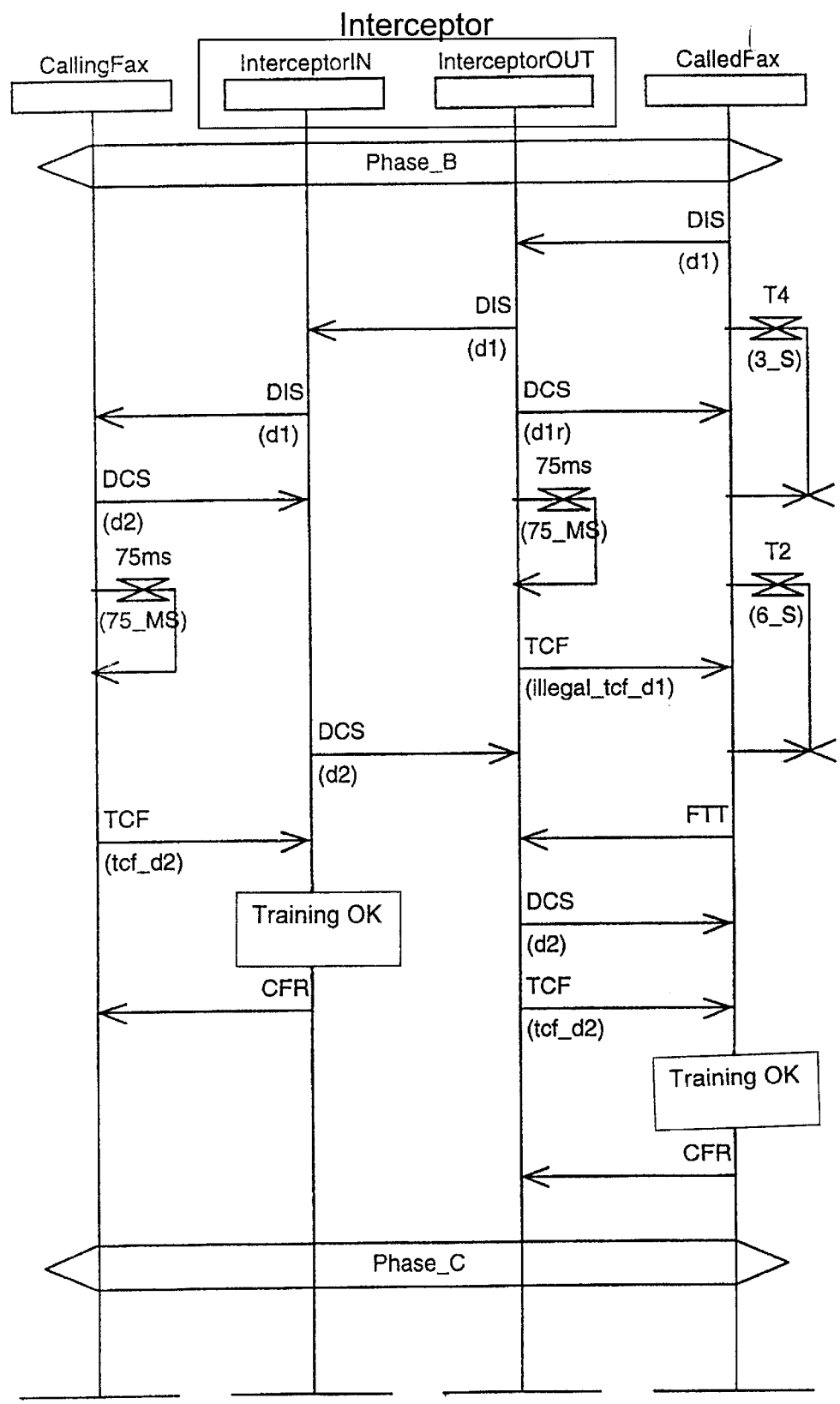
FIG. 1 is a diagram illustrating a first embodiment of the method according to the present invention, of phase B in a fax transmission.

The MSC given in FIG. 1 shows the initial interaction with the tightly connected buffering of the Interceptor. We notice that the InterceptorOUT anticipates a DCS before the real DCS has returned from the CallingFax. That DCS is assumed to be the DCS response which takes the maximum functionality out of the communication between the Interceptor and the Called Fax.

The corresponding TCF (training sequence) is simulated and erroneous! Following the illegal TCF the CalledFax will respond by a Fail To Train (FTT) and then the real DCS will have arrived to the Interceptor and can be forwarded to the Called Fax.

Figure 2:
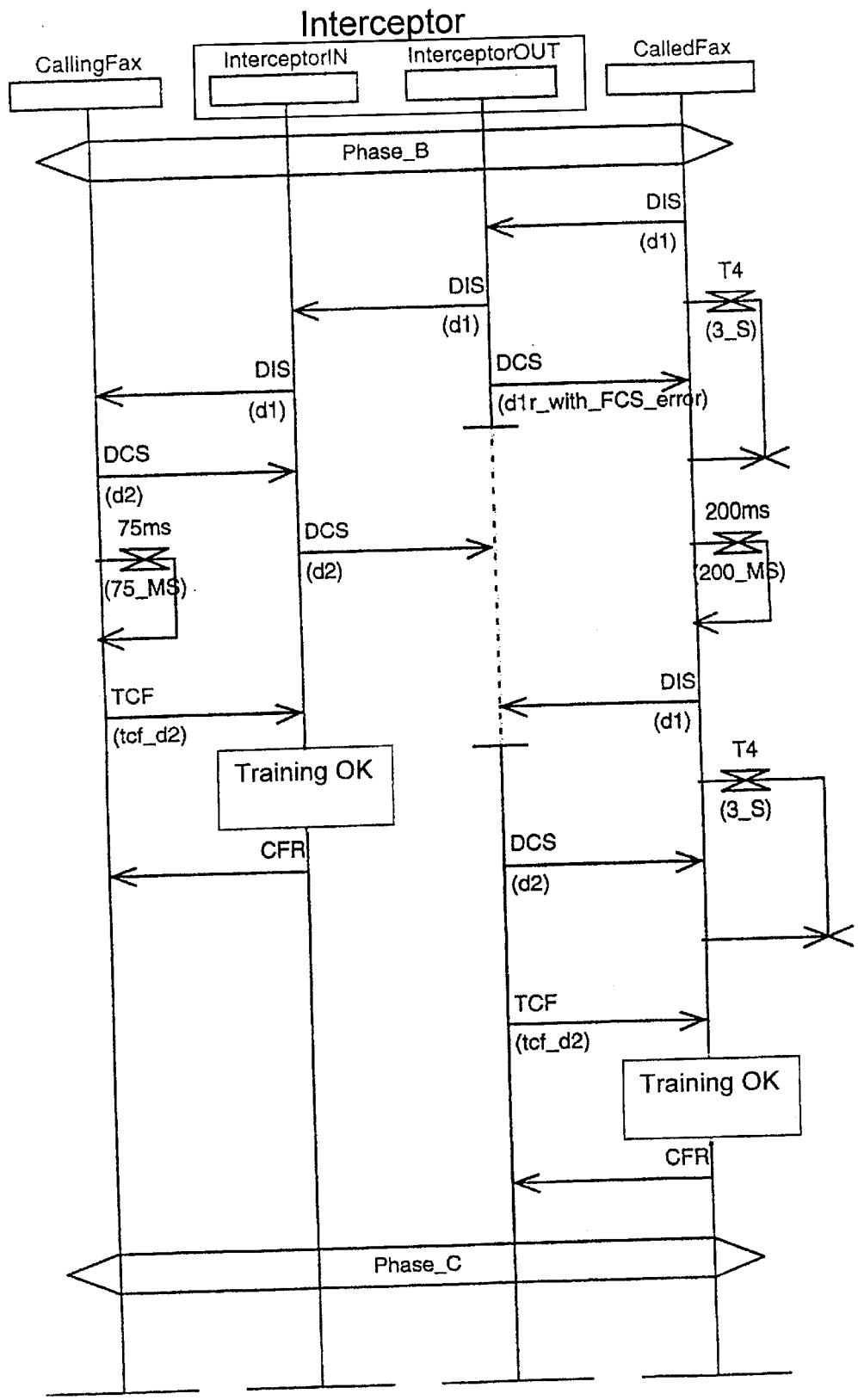
FIG. 2 is a schematic diagram illustrating another embodiment of the method according to the present invention, of phase B and in a fax transmission.

Second solution: Illegal Checksum
Reference is made to FIG. 2.

This solution to the initial set-up delay problem is based on simulating a checksum error in the return of a DCS. Thereby the CalledFax will return another DIS and we can assume that the proper DCS is available.

Figure 3:
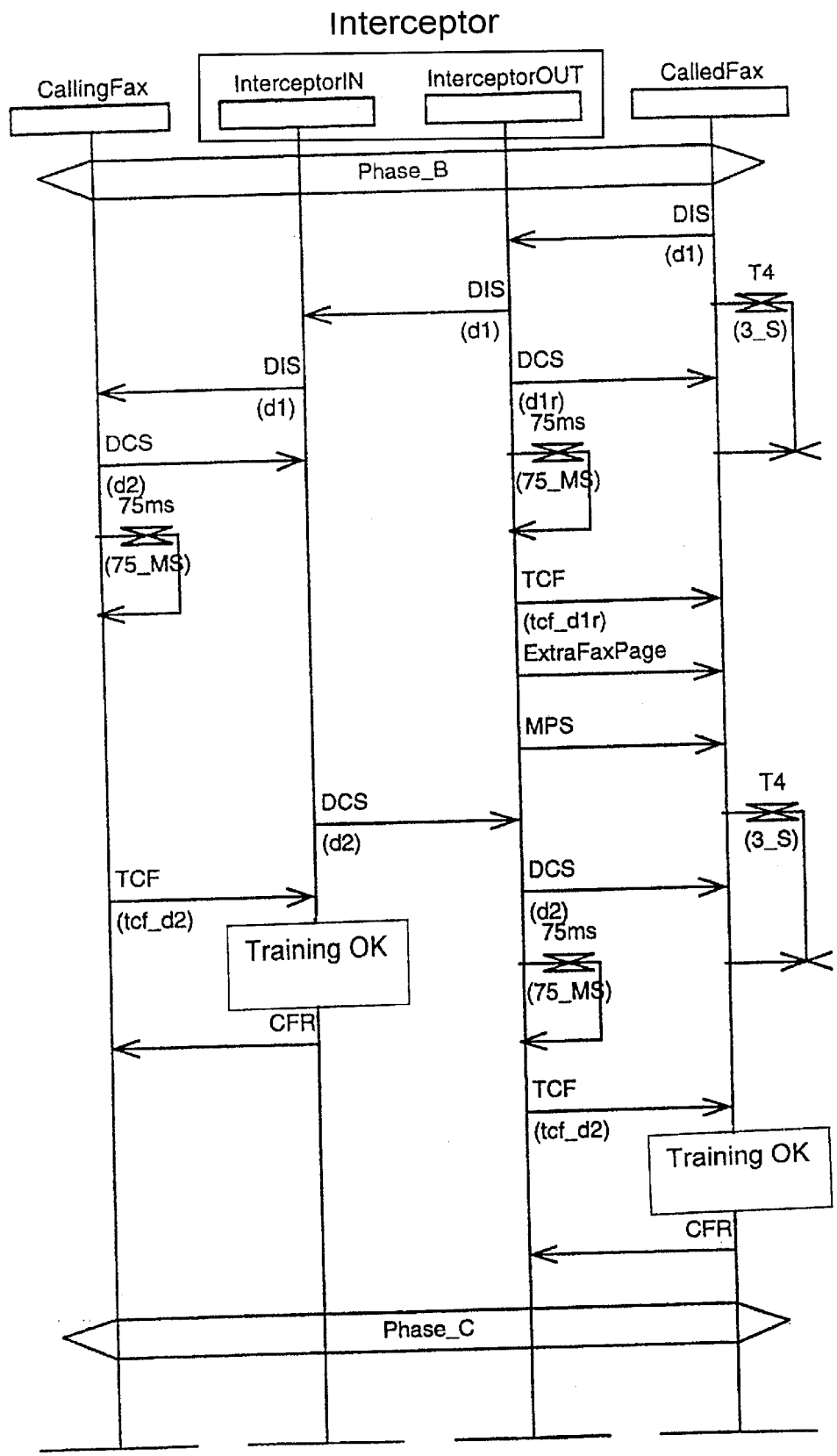
FIG. 3 is a schematic diagram illustrating still another embodiment of the method according to the present invention, of phase B in a fax transmission.

Third solution: Extra Front Page
Reference is made to FIG. 3.

This solution is based on producing an extra front page to the CalledFax! This will give time for the Interceptor to receive the correct DCS from the Calling Fax.

Normal Situation Phase C

The fax transmission phase should in the normal situation be a simple buffered transfer of data. The amount of buffering is determined by the method used for prolonging the duration of the initial negotiation in Phase B.

Figure 4:
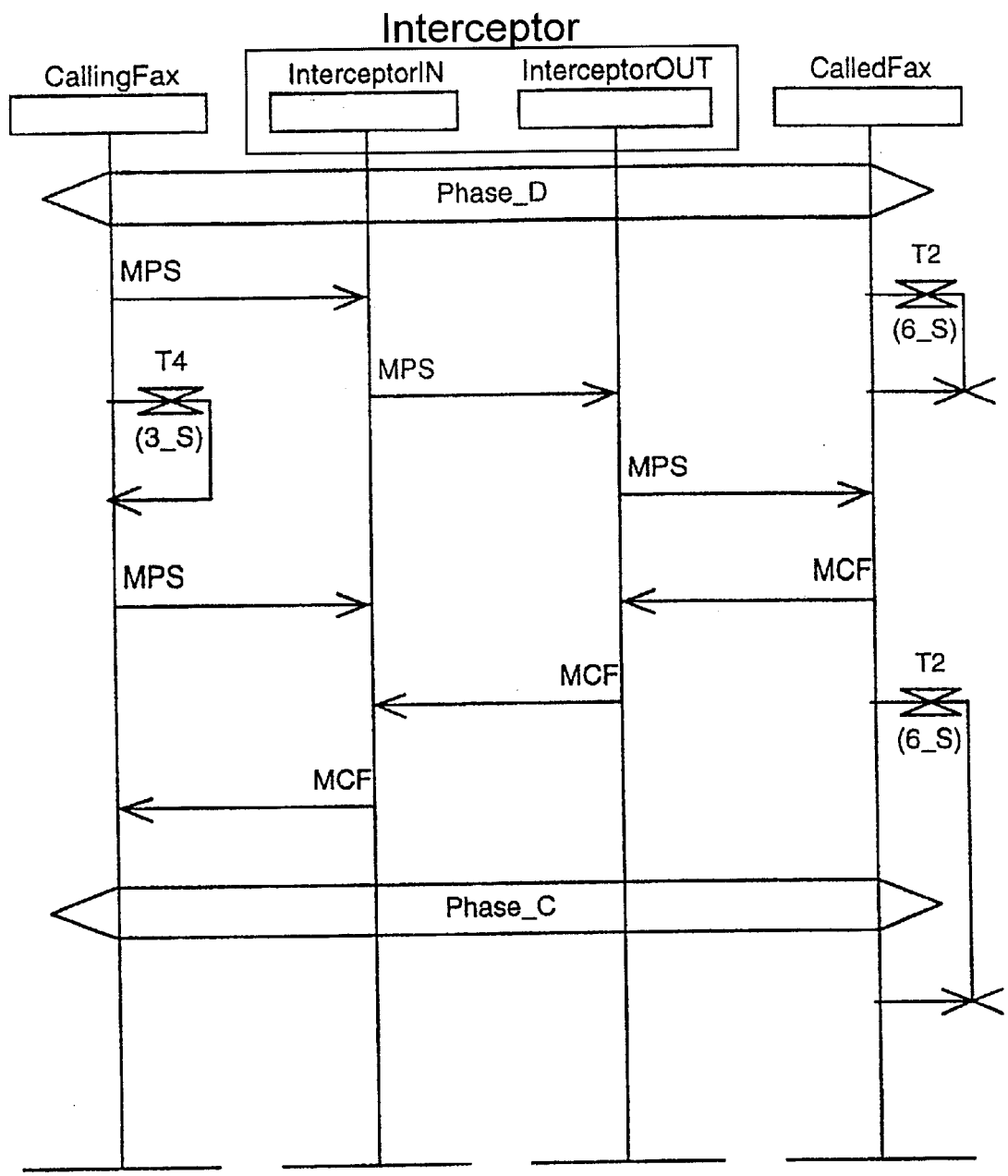
FIG. 4 is a diagram illustrating details of yet another embodiment of the present invention, relating to phase D in a fax transmission.

Normal Situation Phase D
Reference is made to FIG. 4.

Between fax pages the situation is simpler than initially as CallingFax will repeat its MPS (or EOP) if the T4 timer expires. As long as the T2 timer does not expire, the buffering is simple.

Training Problem

What if one of the legs experience training problems?

In case there is a training problem from CallingFax to InterceptorIN, we continue to send the troubled training on to CalledFax which will of course return an FTT. We have of course already sent FTT back to CallingFax from InterceptorIN.

In case there is a training problem from InterceptorOUT to CalledFax, the fax page must be buffered at the Interceptor while the back-end leg is solving the training problem. One full page may in the worst case have to be buffered.

The speed of the CallingFax may be modified during the first between pages communication by returning an RTP or RTN.

Combined Speech and Fax

The combined speech and fax facility is an instance of an optional service (relative to T.30). Such optional services can be invoked during the negotiation in between fax pages.

Our solution aims to keep the two legs as synchronous as possible. Any interrupt PIN or PIP will be transparently transmitted and so will all optional communication. T.30 does not specify any strict timers concerning such optional operations and therefore the timing issue should not come into play.

Advantages

The main advantage with this solution is that it is more robust towards variances in fax implementations.

Furthermore it makes the extra delay as short as possible by keeping the two legs as synchronous as possible.

Even though the solution applies assumptions of what commands would appear if the delay had not been present, it does not actually send false commands.

Broadening

The kind of solution can be applied everywhere fixed delays become too short and there is a need for extra flexibility. The two components of the Interceptor need not be interpreting the very same protocol.

Abbreviations

General

GSM—Global System for Mobile Communication

HDLC—High Level Data Link Control

ITU T.30—Procedures for document facsimile transmission in the general switched telephone network MSC—Message Sequence Charts ITU T.4—Standardization of Group 3 facsimile terminals for document transmission ITU Z.120—Message Sequence Charts Refering to T.30

FTT—Failure to Train

DCS—Digital Command Signal

TFC—(Training Sequence) Training Check is a series of 0-s without C HDLC format sent through t.4 modulation to verify training DIS—Digital Identification Signal MPS—Multi-Page Signal EOP—End Of Procedure RTP—Retrain Positive RTN—Retrain Negative PIN—Procedural Interrupt Negative PIP—Procedural Interrupt Positive t1—t.30 timer 35±5 s t2—t.30 timer 6±1 s t3—t.30 timer 10±5 s t4—t.30 timer 3.0 s±15% for automatic units 4.5 s±15% for manual units

What is claimed is:

1. A method for overcoming long delays in the transmission between two fax machines connected for fax transmission, comprising:

dividing a connection between a calling fax machine and a called fax machine into at least two separate connections by an interceptor, wherein the interceptor operates as a fax receiver and a fax transmitter tied together by internal communication;

buffering, by the interceptor, data transmitted from the calling fax machine;

transmitting, by the interceptor to the called fax machine, a fax front page explaining any added delays;

transmitting an illegal training sequence from the interceptor to the called fax machine;

transmitting from the called fax machine, in response to the illegal training sequence, a failure to train signal; and waiting, by the called fax machine, reception of a digital command signal from the calling fax machine, wherein, if there is a training problem from the calling fax machine to the interceptor, sending a troubled training signal continually to the called fax machine until a failure to train signal is returned therefrom, a failure to train signal having already been sent to the calling fax from the interceptor.

2. A method for overcoming long delays in the transmission between two fax machines connected for fax transmission, comprising:

dividing a connection between a calling fax machine and a called fax machine into at least two separate connections by an interceptor, wherein the interceptor operates as a fax receiver and a fax transmitter tied together by internal communication;

buffering, by the interceptor, data transmitted from the calling fax machine;

transmitting, by the interceptor to the called fax machine, a fax front page explaining any added delays;

transmitting an illegal training sequence from the interceptor to the called fax machine;

transmitting from the called fax machine, in response to the illegal training sequence, a failure to train signal; and waiting, by the called fax machine, reception of a digital command signal from the calling fax machine, wherein, if there is a training problem from the interceptor to the called fax machine, buffering data transmitted by the calling fax machine while the training problem is being solved.

3. The method according to claim 2, wherein a maximum of one full page is buffered.

* * * * *